(12) United States Patent
Lin et al.

(10) Patent No.: US 8,284,161 B2
(45) Date of Patent: Oct. 9, 2012

(54) WIRELESS MOUSE FOR INPUTTING COMMANDS TO A HOST COMPUTER

(75) Inventors: Yin-Yu Lin, Taipei (TW); Yang-Ning Lin, Taipei (TW); Sue-Yi Chen, Taipei (TW)

(73) Assignee: Giga-Byte Technology Co., Ltd., New Taipei (TW)

( * ) Notice: Subject to any disclaimer, the term of this patent is extended or adjusted under 35 U.S.C. 154(b) by 264 days.

(21) Appl. No.: 12/588,862

(22) Filed: Oct. 30, 2009

(65) Prior Publication Data

US 2011/0102322 A1     May 5, 2011

(51) Int. Cl.
    *G09G 5/08*     (2006.01)

(52) U.S. Cl. ........................................ 345/163

(58) Field of Classification Search ........... 345/163–184
See application file for complete search history.

(56) References Cited

U.S. PATENT DOCUMENTS

| | | | |
|---|---|---|---|
| 4,500,795 A * | 2/1985 | Hochstein et al. | ............ 307/141 |
| 6,909,421 B2 | 6/2005 | Wang | |
| 7,492,285 B2 | 2/2009 | Chiang et al. | |
| 7,499,028 B2 | 3/2009 | Eichenberger et al. | |
| 2006/0087016 A1* | 4/2006 | Wada et al. | ................... 257/679 |
| 2006/0139329 A1* | 6/2006 | Lin et al. | ......................... 345/163 |
| 2006/0244726 A1* | 11/2006 | Wang et al. | .................... 345/163 |
| 2007/0005844 A1* | 1/2007 | Lee et al. | ......................... 710/62 |
| 2007/0171096 A1* | 7/2007 | Chiang et al. | .................... 341/20 |
| 2009/0225029 A1* | 9/2009 | Wu | ................. 345/163 |
| 2010/0283733 A1* | 11/2010 | Wu et al. | ........................ 345/163 |

FOREIGN PATENT DOCUMENTS

| | | |
|---|---|---|
| TW | 545645 | 8/2003 |
| TW | 545648 | 8/2003 |
| TW | 200727159 | 7/2007 |

* cited by examiner

*Primary Examiner* — Chanh Nguyen
*Assistant Examiner* — Sanghyuk Park
(74) *Attorney, Agent, or Firm* — Chun-Ming Shih

(57) ABSTRACT

A wireless mouse for inputting commands to a host computer includes a casing, a control circuit, a wireless receiver, an electronic switch circuit and a resilient member. The control circuit includes a wireless module to transmit a wireless signal to the wireless receiver. The wireless receiver can be either received in the port of the casing or attached to a connector of the host computer. The electronic switch circuit includes a control terminal, a power input terminal connected to an external power source, and a power output terminal connected to the control circuit. The input and output power terminals are electrically connected or disconnected according to electrical potential at the control terminal. The resilient member is disposed on an inner side of the port. The resilient member is electrically connected with the control terminal by insertion of the wireless receiver in order to disconnect the input and output power terminals.

3 Claims, 2 Drawing Sheets

WIRELESS MOUSE FOR INPUTTING COMMANDS TO A HOST COMPUTER

BACKGROUND OF INVENTION

1. Field of Invention

This invention relates to a wireless mouse and more particularly to a wireless mouse which is activated or deactivated by use of an electronic switch circuit.

2. Related Prior Art

Wireless mice are known in the art. Such wireless mice are typically configured for inputting commands to host computers. Basically, the wireless mouse includes a mouse body and a receiver. Normally, when not in use, the receiver of the wireless mouse is received in a port of the mouse body. However, when a user needs to use the wireless mouse, the receiver can be detached from the mouse body and then attached to a connector port of the host computer to serve as a communication interface between the wireless mouse and the host computer. Additionally, since the wireless mouse is a high power consumptive device, a power switch may be included on bottom or side surface of the mouse body so that the wireless mouse may be turned off via the power switch for saving energy while not in use. Therefore, in virtue of the power switch exposed outside the mouse body, a user can manipulate the power switch of the wireless mouse from outside.

Another type of wireless mice has its receiver mounted inside the mouse body in such a way that the wireless mouse can be turned off by simply inserting the receiver into a port of the mouse body or otherwise be powered on by withdrawing the same from the port. Two such wireless mice are described in TW Pat. No. 545648 and TW Publication No. 200727159. As shown in the prior art, when the wireless mouse is not in use, the receiver will be placed in the port of the mouse body for store and simultaneously touches the power switch, which is located inside the mouse body, and thereby cuts off the power for the mouse body. On the contrary, when a user needs to use the wireless mouse, the receiver can be withdrawn from the port of the mouse body to switch the wireless mouse on.

SUMMARY OF INVENTION

Broadly stated, the present invention is directed to a wireless mouse for inputting commands to a host computer. The wireless mouse comprises a casing, a wireless receiver and a resilient member. Inside the casing are a control circuit and an electronic switch circuit.

Specifically, the control circuit includes a wireless module for transmitting a wireless signal to the wireless receiver. The wireless receiver is configured to be either received in a port of the casing or attached to a connecting port of the host computer. The electronic switch circuit mainly includes a control terminal, a power input terminal connected to an external power source, and a power output terminal connected to the control circuit. In particular, the input and output power terminals are configured to be electrically connected or disconnected according to electrical potential at the control terminal. The resilient member is disposed on an inner side of the port of the casing. Additionally, the resilient member is configured to be either electrically connected or disconnect with the control terminal of the electronic switch circuit.

As described above, when the wireless receiver is inserted in the port of the casing, the resilient member is pressed by the wireless receiver and simultaneously touches the control terminal of the electronic switch circuit, and thereby enables the electronic switch circuit to be in turn-off state where the input and output power terminals of the electronic switch circuit are disconnected. That is, the control circuit cannot be powered by the external power source via the electronic switch circuit. On the other hand, when the wireless receiver is withdrawn from the port of the casing, the resilient member is released from the wireless receiver and detached from the control terminal of the electronic switch circuit as a result of the resilience stored in the resilient member, and thereby enables the electronic switch circuit to be in turn-on state where the input and output power terminals of the electronic switch circuit are connected. That is, the control circuit is allowed to be powered by the external power source via the electronic switch circuit.

According to the present invention, the construction of the electronic switch circuit enables the wireless mouse to be turned on (or off) via insertion (or withdrawal) of the wireless receiver into (or from) the port of the casing with the help of the resilient member.

Preferably, the wireless mouse further includes a magnetic member disposed on a side of the port of the casing. And, the wireless receiver includes a metallic connector. In this way, the metallic connector of the wireless receiver is firmly attracted by the magnetic member when the wireless receiver is received in the port of the casing. As such, the wireless receiver can be easily secured on the casing or removed from the casing, if necessary.

The present invention and the advantages thereof will become more apparent upon consideration of the following detailed description when taken in conjunction with the accompanying drawings.

BRIEF DESCRIPTION OF DRAWINGS

The invention is illustrated by the accompanying drawings in which corresponding parts are identified by the same numerals and in which.

DETAILED DESCRIPTION OF PREFERRED EMBODIMENT

Figure 2:
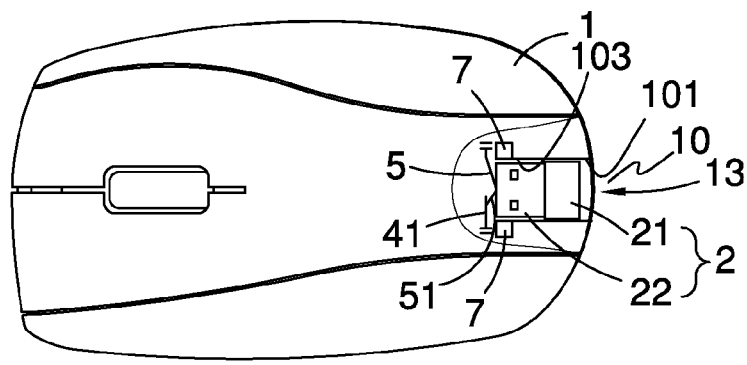
FIG. 2 is a top view of the wireless mouse shown in FIG. 1, illustrating that the wireless receiver is received in the port of the casing.
Figure 3:
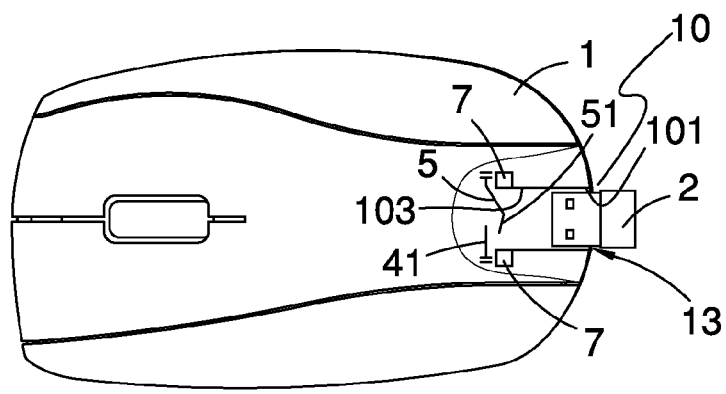
FIG. 3 is a view similar to FIG. 2, illustrating the wireless receiver is partly withdrawn from the port of the casing.
Figure 4:
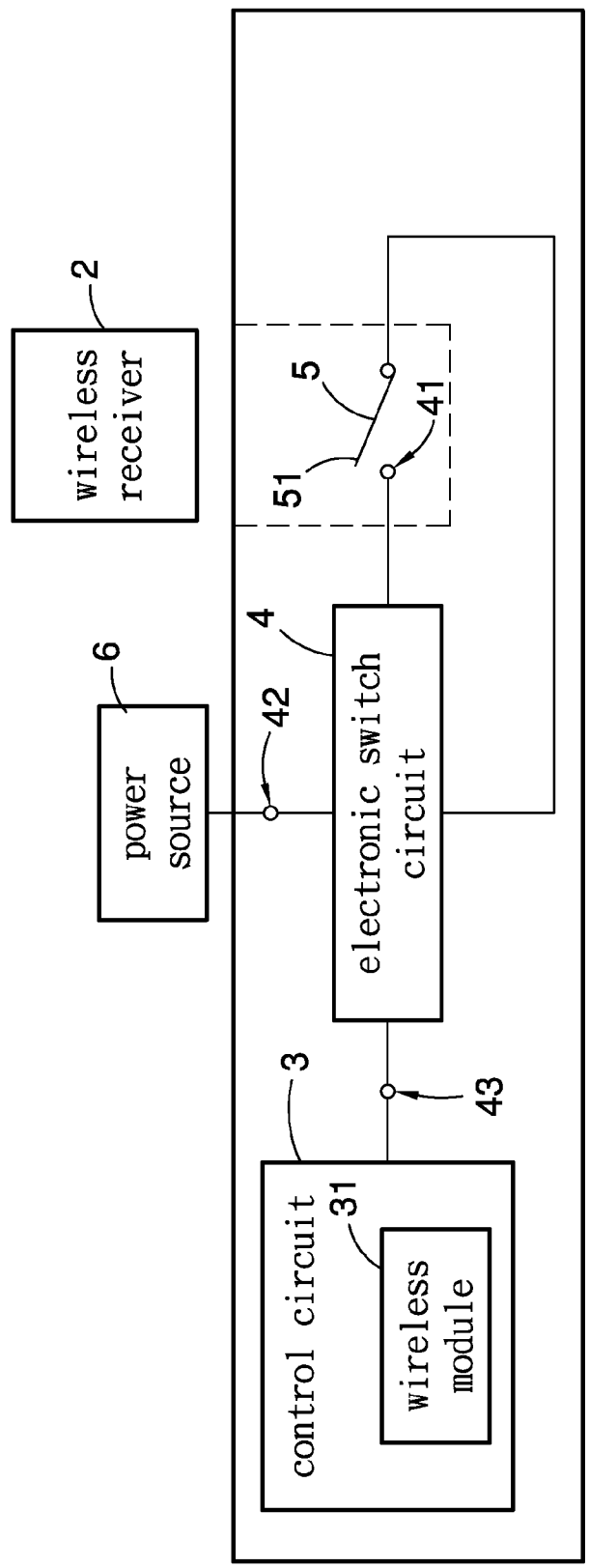
FIG. 4 is a circuit block diagram of the wireless mouse according to the preferred embodiment.

Referring now to FIGS. 1 through 4 of the drawings, a wireless mouse for inputting commands to a host computer in accordance with the preferred embodiment of the invention includes a casing 1, a wireless receiver 2, a control circuit 3, an electronic switch circuit 4 and a resilient member 5. As can be seen in FIG. 4, the control circuit 3, the electronic switch circuit 4 and the resilient member 5 are located inside the casing 1.

Figure 1:
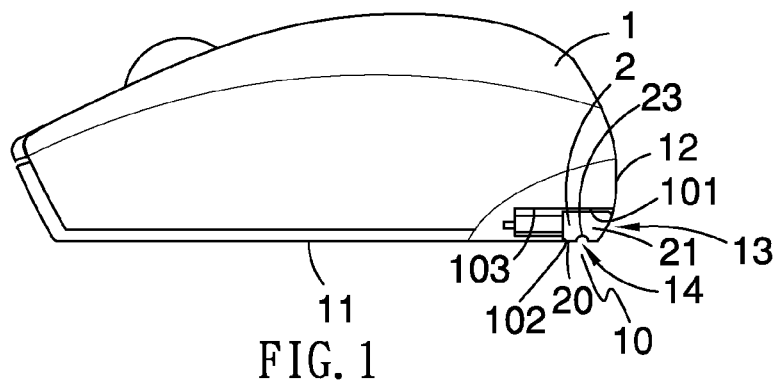
FIG. 1 is a side view, partially broken away to show details of construction, of a wireless mouse in accordance with the preferred embodiment of the present invention.

FIG. 1 is a side view, partially broken away to show details of construction, of a wireless mouse, illustrating a port 10 for receiving the wireless receiver 2, the port 10 having a notch 101 in a corner defined between adjacent bottom and side surfaces 11, 12 of the casing 1. The notch 101 of the port 10 has a first opening 13 in the side surface 12 of the casing 1 and a second opening 14 in the bottom surface 11 of the casing 1.

The notch 101 further has an inner wall 102 facing the first opening 13 thereof, and the port 10 further has a recess 103 defined on the inner wall 102 of the notch 101. When the wireless mouse is not in use, the wireless receiver 2 can be stored in the port 10 of the casing 1. Conversely, when the wireless mouse is in use, the wireless receiver 2 is withdrawal from the port 10 of the casing 1 and attached to a connecting port of the host computer (not shown) to serve as a communication interface between the wireless mouse and the host computer. In this embodiment, a universal series bus (USB) connection is employed between the wireless receiver 2 and the connecting port of the host computer so as to enable communication therebetween via the wireless receiver 2.

FIG. 4 is a circuit block diagram of the wireless mouse. As can be seen in FIG. 4, the control circuit 3 includes a wireless module 31 capable to transmit a wireless signal to the wireless receiver 2. On the other hand, the electronic switch circuit 4 composed of resistors, electronic components or otherwise is a switch circuit on a printed circuit board. Specifically, the electronic switch circuit 4 includes a control terminal 41, a power input terminal 42, and a power output terminal 43. The power input terminal 42 of the electronic switch circuit 4 is connected to an external power source 6, such as a battery. The power output terminal 43 of the electronic switch circuit 4 is connected to the control circuit 3. In this way, if the input and output power terminals 42, 43 of the electronic switch circuit 4 are electrically connected, power can be passed from the external power source 6 to the control circuit 3 via the electronic switch circuit 4. However, it is the electrical potential at the control terminal of the electronic switch circuit 4, which decides whether the input and output power terminals 42, 43 of the electronic switch circuit 4 are electrically connected or not.

FIG. 2 is a top view of the wireless mouse, illustrating the resilient member 5 is located in an inner side of the recess 103 of the port 10 and faces the first opening 13 of the notch 101 of the port 10 of the casing 1. The resilient member 5 has an end 51 which is movable along a direction toward the first opening 13 of the notch 101 of the port 10 and configured to be either electrically connected or disconnect with the control terminal 41 of the electronic switch circuit 4. When the wireless mouse is not in use with its wireless receiver 2 received in the port 10 of the casing 1, the resilient member 5 is pressed by the wireless receiver 2 and the end 51 of the resilient member 5 touches the control terminal 41 of the electronic switch circuit 4, as depicted in FIG. 2. Since the control terminal 41 of the electronic switch circuit 4 is in contact with the end 51 of the resilient member 5, the electrical potential at the control terminal 41 is changed and therefore directly and individually have the electronic switch circuit 4 be in turn-off state where the input and output power terminals 42, 43 of the electronic switch circuit 4 are disconnected. In other words, the control circuit 3 is stopped from being powered by the external power source 6 via the electronic switch circuit 4. Therefore, it is quite convenient for a user to store the wireless receiver 2 and turn off the wireless mouse at the same time.

Conversely, as shown in FIGS. 3 and 4, when the wireless receiver 2 is withdrawn from the port 10 of the casing 1 for using the wireless mouse, the resilient member 5 is released from the wireless receiver 2 and the end 51 of the resilient member 5 is detached from the control terminal 41 of the electronic switch circuit 4 and bounces toward the first opening 13 of the notch 101 of the port 10 of the casing 1 from the control terminal 41 of the electronic switch circuit 4 as a result of the resilience stored in the resilient member 5. In the meanwhile, the electrical potential at the control terminal 41 of the electronic switch circuit 4 is returned to its original state, and thereby directly and individually enables the electronic switch circuit 4 to be in turn-on state where the input and output power terminals 42, 43 of the electronic switch circuit 4 are connected. At this time, the control circuit 3 is allowed to be powered by the external power source 6 via the electronic switch circuit 4. As shown above, the electronic switch circuit 4 incorporates the resilient member 5 to make the wireless mouse more humane.

Furthermore, the wireless mouse further comprises a set of magnetic members 7 disposed on opposed sides of the recess 103 of the port 10 of the casing 1. On the other hand, the wireless receiver 2 includes a plastic handle portion 21 and a metallic connector 22 joined to a front side of the plastic handle portion 21. As shown in FIG. 2, when the wireless receiver 2 is received in the port 10 of the casing 1, the metallic connector 22 of the wireless receiver 2 is received in the recess 103 of the port 10 and is firmly attracted by the magnetic member 7. As such, the wireless receiver 2 can be easily secured on the casing for store.

Referring back to FIG. 1, when the wireless receiver 2 is received in the port 10 of the casing 1, the wireless receiver 2 is partly exposed outside the port 10 of the casing 1 via the notch 101 thereof. As such, the wireless receiver 2 can be pulled out from the port 10 of the casing 1 by pushing outwardly the exposed portion of the wireless receiver 2.

In order to assist in withdrawal of the wireless receiver 2 from the port 10 of the casing 1, the plastic handle portion 21 of the wireless receiver 2 further defines a concave 23 in a bottom surface 20 thereof, as shown in FIG. 1. That is, when the wireless receiver 2 is received in the port 10 of the casing 1, the plastic handle portion 21 is exposed outside the port 10 of the casing 1 via the notch 101 thereof and the concave 23 of the plastic handle portion 21 of the wireless receiver 2 is exposed outside the bottom surface 11 of the casing 1. In such a fashion, a user can easily dig out the wireless receiver 2 with a finger by use of the concave 23 of the plastic handle portion 21 of the wireless receiver 2. It is noted that the resilience stored in the resilient member 5 may also help to push the wireless receiver 2 outside the port 10 of the casing 1 during the withdrawal process of the wireless receiver 2. Thus, the withdrawal of wireless receiver 2 from the casing 1 can be done easily.

It will be appreciated that although a particular embodiment of the invention has been shown and described, modifications may be made. It is intended in the claims to cover such modifications which come within the spirit and scope of the invention.

The invention claimed is:

1. A wireless mouse for inputting commands to a host computer, the wireless mouse comprising:
   a casing having a port which has a notch in a corner defined between adjacent bottom and side surfaces of the casing; the notch having a first opening in the side surface of the casing and a second opening in the bottom surface of the casing; and the port further having a recess defined on an inner wall of the notch which faces the first opening thereof;
   a control circuit disposed in the casing and including a wireless module capable to transmit a wireless signal;
   a wireless receiver configured to receive the wireless signal sent by the wireless module of the control circuit and to be either inserted in the port of the casing or attached to a connecting port of the host computer; and wherein while the wireless receiver is inserted in the port of the casing, the wireless receiver is partly exposed outside the the port of the casing via the notch thereof;

an electronic switch circuit disposed in the housing and including a control terminal, a power input terminal connected to an external power source, and a power output terminal connected to the control circuit; the input and output power terminals being configured to be electrically connected or disconnected according to electrical potential at the control terminal; and a resilient member disposed on an inner side of the recess of the port and facing the first opening of the notch of the port of the casing, and the resilient member having an end which is movable along a direction toward the first opening of the notch of the port and configured to be either electrically connected or disconnect with the control terminal of the electronic switch circuit;

wherein when the wireless receiver is inserted in the port of the casing, the resilient member is pressed by the wireless receiver and the end of the resilient member touches the control terminal of the electronic switch circuit, and thereby directly and individually enables the electronic switch circuit to be in turn-off state where the input and output power terminals of the electronic switch circuit are disconnected; and when the wireless receiver is withdrawn from the port of the casing, the resilient member is released from the wireless receiver and the end of the resilient member is detached from the control terminal of the electronic switch circuit and bounces toward the first opening of the notch of the port as a result of resilience stored in the resilient member, and thereby directly and individually enables the electronic switch circuit to be in turn-on state where the input and output power terminals of the electronic switch circuit are connected.

2. The wireless mouse of claim 1 further comprising a magnetic member disposed on a side of the recess of the port of the casing, the wireless receiver including a metallic connector, wherein while the wireless receiver is inserted in the port of the casing, the metallic connector of the wireless receiver is received in the recess of the port of the casing and is firmly attracted by the magnetic member.

3. The wireless mouse of claim 1, wherein the wireless receiver further has a plastic handle portion defining a concave in a bottom surface thereof for digging out the wireless receiver with a finger, and when the wireless receiver is inserted in the port of the casing, the plastic handle portion is exposed outside the port of the casing via the notch thereof and the concave of the plastic handle portion of the wireless receiver is exposed outside the bottom surface of the casing.

* * * * *